(12) United States Patent
Schaub et al.

(10) Patent No.: US 7,720,726 B2
(45) Date of Patent: May 18, 2010

(54) AUTOMATIC GENERATION OF RIB RULES IN COMPUTERIZED FINANCIAL MANAGEMENT SYSTEM

(75) Inventors: Thomas M. Schaub, Antibes (FR); Horst Schnoerer, Angelbachtal (DE); Andreas Schaefer, Mougins (FR)

(73) Assignee: SAP AG, Walldorf (DE)

( * ) Notice: Subject to any disclaimer, the term of this patent is extended or adjusted under 35 U.S.C. 154(b) by 1638 days.

(21) Appl. No.: 10/740,559

(22) Filed: Dec. 22, 2003

(65) Prior Publication Data

US 2005/0137891 A1 Jun. 23, 2005

(51) Int. Cl.
*G06Q 40/00* (2006.01)
(52) U.S. Cl. .......................................... 705/30; 705/35
(58) Field of Classification Search .................... 705/30
See application file for complete search history.

(56) References Cited

U.S. PATENT DOCUMENTS

| | | | | |
|---|---|---|---|---|
| 6,014,640 | A * | 1/2000 | Bent ........................... | 705/30 |
| 6,128,602 | A * | 10/2000 | Northington et al. ........... | 705/35 |
| 2002/0087441 | A1* | 7/2002 | Wagner et al. ................ | 705/30 |
| 2002/0174006 | A1* | 11/2002 | Rugge et al. .................. | 705/10 |
| 2003/0040988 | A1* | 2/2003 | Ha et al. ........................ | 705/30 |
| 2005/0033669 | A1* | 2/2005 | Stremler et al. ............... | 705/30 |

OTHER PUBLICATIONS

2000 Development Requests at HERTUG (Higher Education and Research Institutions), dowloaded on May 5, 2008.*
Official Answer to 2000 Development Requests, downloaded on May 5, 2008 http:llweb, mit.ed u. herldevreqldev_req_2OOl_official answer.htm.*
Banham, Russ, "Better Budgets," Feb. 2000, Journal of Accountancy, v189n2, pp: 37-40.*

* cited by examiner

*Primary Examiner*—Narayanswamy Subramanian
*Assistant Examiner*—Seth Weis
(74) *Attorney, Agent, or Firm*—Kenyon & Kenyon LLP

(57) ABSTRACT

Financial management applications may operate according to RIB rules in which expenditure budget limits are increased as an organization or department thereof realizes revenue. When such applications operate in conjunction with complicated data structures for revenues and budget, it can become burdensome to define a plurality of RIB rules individually. A configuration system includes a RIB strategy array containing a relatively small set of meta-rules for identifiers of various portions of a revenue data structure to which they apply. An automated configuration system surveys the revenue data structure, determines which value transforms and destination addresses of a budget database apply and generate a larger set of RIB rules that will govern in the financial management application during normal system operation.

26 Claims, 4 Drawing Sheets

100

200

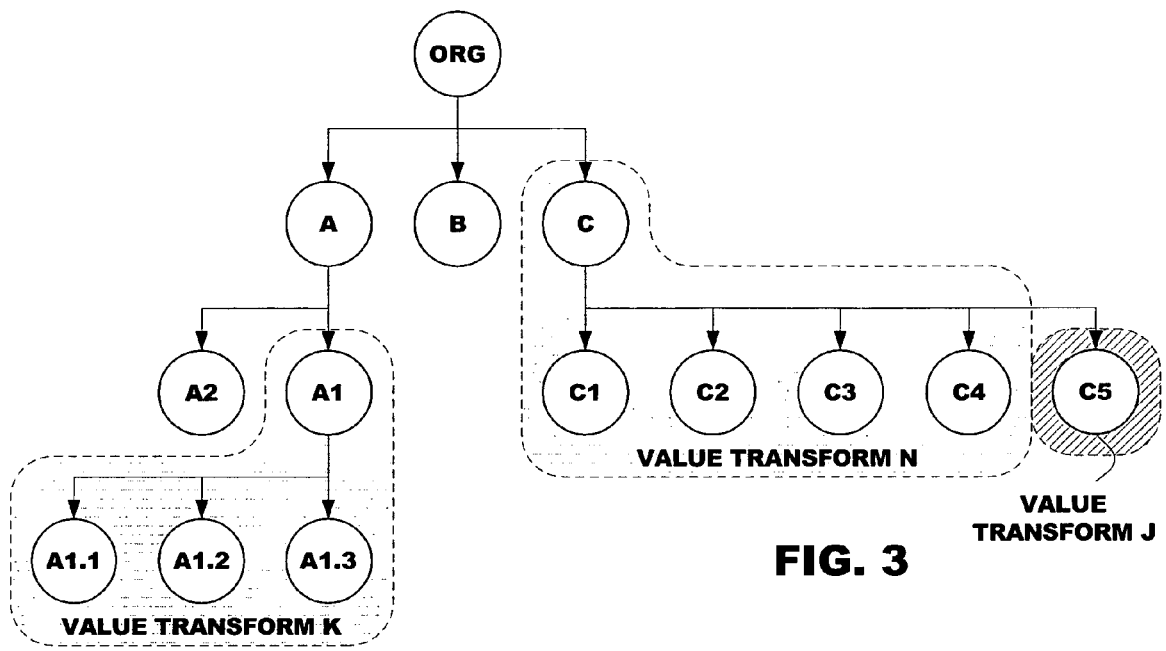

FIG. 3

| | | |
|---|---|---|
| 410 → A1, A1.1, A1.2, A1.3 | K: 100% OF ALL INCOMING PAYMENTS ABOVE $100K | SEPARATE RIB RULES PER SOURCE ADDRESS; APPLY TRANSFORM FUNCTION $F_1$ |
| 420 → C, C1, C2, C3, C4 | N: 100% OF ALL CUSTOMER INVOICES UP TO $100K | SEPARATE RIB RULES PER SOURCE ADDRESS; APPLY TRANSFORM FUNCTION $F_2$ |
| 430 → C5 | J: $1M IF INCOMING PAYMENTS ≥ $10M | SEPARATE RIB RULES PER SOURCE ADDRESS; APPLY TRANSFORM FUNCTION $F_3$ |

SOURCE IDENTIFIER 440   VALUE TRANSFORM 450   ADDRESS TRANSFORM 460

FIG. 4
400

| Source Address 540 | Value Transform 550 | Destination Address 560 |
|---|---|---|
| A1 | K: 100% OF ALL INCOMING PAYMENTS ABOVE $100K | $F_1(A1)$ |
| A1.1 | K: 100% OF ALL INCOMING PAYMENTS ABOVE $100K | $F_1(A1.1)$ |
| A1.2 | K: 100% OF ALL INCOMING PAYMENTS ABOVE $100K | $F_1(A1.2)$ |
| A1.3 | K: 100% OF ALL INCOMING PAYMENTS ABOVE $100K | $F_1(A1.3)$ |
| C | N: 100% OF ALL CUSTOMER INVOICES UP TO $100K | $F_2(C)$ |
| C1 | N: 100% OF ALL CUSTOMER INVOICES UP TO $100K | $F_2(C1)$ |
| C2 | N: 100% OF ALL CUSTOMER INVOICES UP TO $100K | $F_2(C2)$ |
| C3 | N: 100% OF ALL CUSTOMER INVOICES UP TO $100K | $F_2(C3)$ |
| C4 | N: 100% OF ALL CUSTOMER INVOICES UP TO $100K | $F_2(C4)$ |
| C5 | J: $1M IF INCOMING PAYMENTS ≥ $10M | $F_3(C5)$ |

FIG. 5
500

| Source Identifier 640 | Value Transform 650 | Address Transform 660 |
|---|---|---|
| DEPT. CODE STARTS WITH "1234" | K: 100% OF ALL INCOMING PAYMENTS ABOVE $100K | SEPARATE RIB RULES PER SOURCE ADDRESS; APPLY TRANSFORM FUNCTION $F_1$ |
| PROJ. CODE INCLUDES "0987" | N: 100% OF ALL CUSTOMER INVOICES UP TO $100K | SEPARATE RIB RULES PER SOURCE ADDRESS; APPLY TRANSFORM FUNCTION $F_2$ |
| SOURCE ADDRESSES HAVING NODE NAMES STARTING WITH "A" | J: $1M IF INCOMING PAYMENTS ≥ $10M | ONE RIB RULE FOR ALL SOURCE ADDRESSES; APPLY TRANSFORM $F_3$ TO HIGHEST LEVEL NODE |

AUTOMATIC GENERATION OF RIB RULES IN COMPUTERIZED FINANCIAL MANAGEMENT SYSTEM

BACKGROUND

The present invention relates to configuration of an enterprise management application and, in particular, to configuration of such an application that includes budgetary control functionality based on RIB techniques.

"RIB" techniques are known per se. RIB is an acronym for "revenues increasing the budget." In many financial applications, expenditure budgets of a predetermined business unit for a given period of time are based upon revenues of that business unit during that same time period. Financial management software, therefore, tracks revenues as they are realized and determine whether the revenues cause changes to an expenditure budget for an organization.

To accomplish this, financial management applications may employ RIB rules. A RIB rule represents a transform from revenue information to expenditure budget information. Within each individual RIB rule, there may be defined one or more source addresses, representing database locations of revenue items, one or more destination addresses, representing database locations of expenditure budget items, and a transform calculation, defining how expenditure budget is derived. Commonly, the transform calculation may define a transform coefficient (e.g., $1 increase in expenditure budget for every $2 in revenue), certain thresholds that must be exceeded before any increase in expenditure budget occurs (e.g., expenditure budget increased only after revenues exceed $100,000), or certain filtering conditions that occur as part of the calculation (e.g., increased expenditure budget occurs only for realized incoming payments, as opposed to customer invoices that have not been paid).

Traditionally, RIB rules have been coded manually. Complex organizations, however, may have thousands of revenue sources and thousands of budget items that are to receive budget through application of the RIB process. During deployment of financial management software, it might become necessary to write thousands of RIB rules to cover the inter-relationships between the revenue items and budget items. This is tedious.

BRIEF DESCRIPTION OF THE DRAWINGS

FIG. 3 illustrates an exemplary data structure with nodes for storing revenue or budget items.

FIG. 4 illustrates elements of an exemplary RIB strategy array according to an embodiment of the present invention.

FIG. 5 illustrates elements of an exemplary RIB rule array according to an embodiment of the present invention.

FIG. 6 illustrates elements of an exemplary RIB strategy array according to another embodiment of the present invention.

DETAILED DESCRIPTION

Embodiments of the present invention capitalize on a realization that, in many organizations, only a handful of RIB transform calculations are unique. Such unique transform calculations will be called "value transforms" hereafter, and may include transform coefficients, thresholds, additional filtering conditions (e.g. for defining accepted types of revenue), as may be appropriate to fully determine the amount of RIB increases from the amount of the posted revenue items. Such value transforms optionally may be defined and stored as separate configuration entities, on which the EMA system may have access at any time and from any application. The RIB rules essentially replicate a small set of value transforms many times across many source-destination address sets. Therefore, the system introduces a meta-rule manager that can generate and write new RIB rules automatically, if given the various value transforms, address transforms from which destination addresses in the budget database may be derived, and identifiers to source addresses in the revenue database to which both types of transforms apply.

Figure 1:
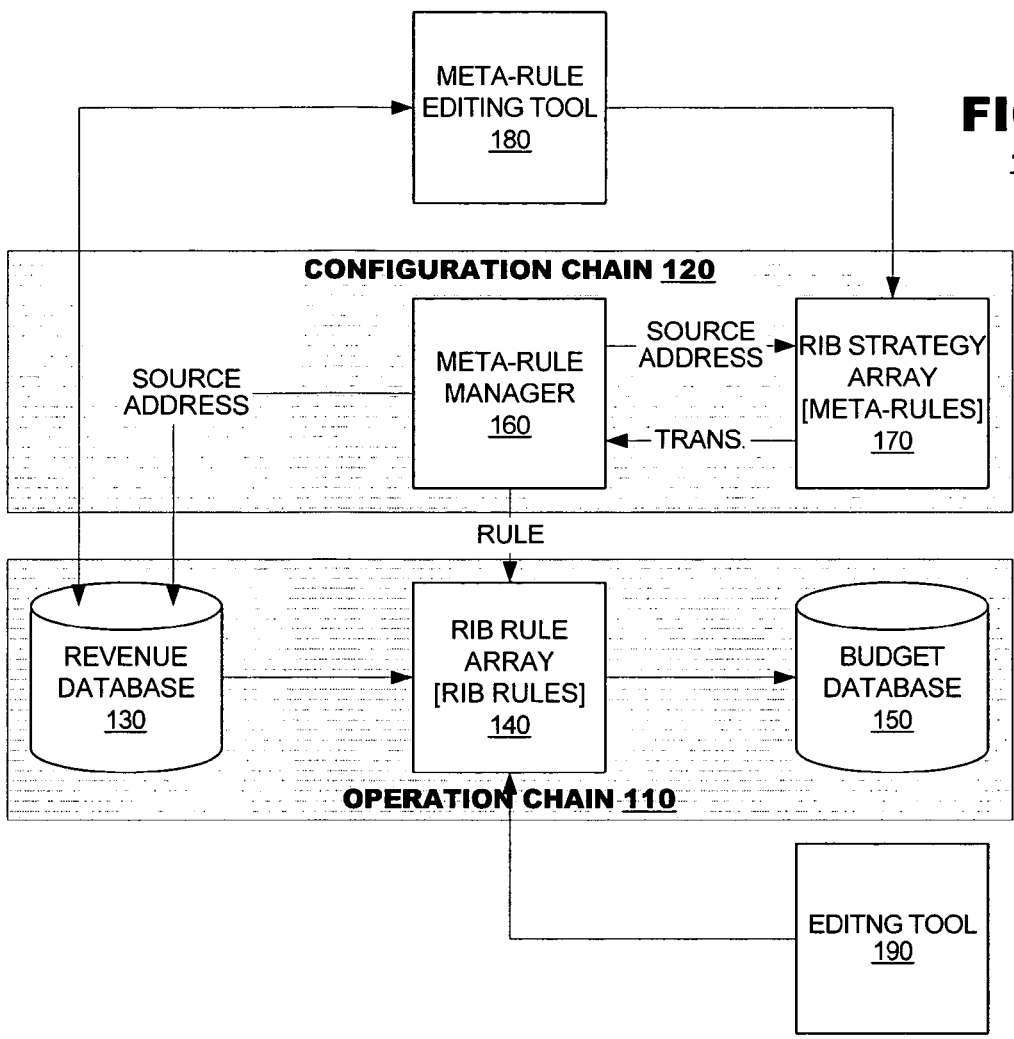
FIG. 1 is a simplified block diagram of a RIB rule processing system according to an embodiment of the present invention.

FIG. 1 is a functional block diagram illustrating a computerized budget management system 100 according to an embodiment of the present invention. The system 100 may include an operation chain 110 and a configuration chain 120. As its name implies, the operation chain 110 is active during normal operation of the system 100. The operation chain 110 may include a revenue database 130, a RIB rule array 140 and a budget database 150. The revenue database 130 stores data representing revenue items that are entered into the system 100 to represent transactions through which an organization realizes revenue. The budget database 150 stores data representing budget items for the organization. The RIB rule array 140 stores RIB rules, which define how various expenditure budget items within the budget database are affected by revenue. In this regard, the operation and structure of a RIB system is well known.

The configuration chain 120 may include a meta-rule manager 160 and a second rule array, called the RIB "strategy" array 170. The RIB strategy array 170 may include meta-rules, each of them including identifiers for source addresses in the revenue database 130, to which these meta-rules apply, a value transform and an address transform, from which destination addresses in the budget database 150 may be obtained. The meta-rule manager 160 may survey the revenue database, identify which of the various transforms apply to each entry of the revenue database 130 and write new RIB rules in the RIB rule array 140.

The budgetary control system 100 may include editing tools 180 and 190 to assist an operator to set up meta-rules in the RIB rule array 170 and to allow for manually updating existing RIB rules in the RIB rule array 140. The editing tool 180 may help to specify source identifiers in meta-rules and to configure value transforms and address transforms, whereas the editing tool 190 may be needed to add necessary changes to existing RIB rules. Users of such systems 100 may require such updates due to legal changes or to organizational changes, such as the assignment of additional tasks to the organization, which may not have been planned in the beginning.

Figure 2:
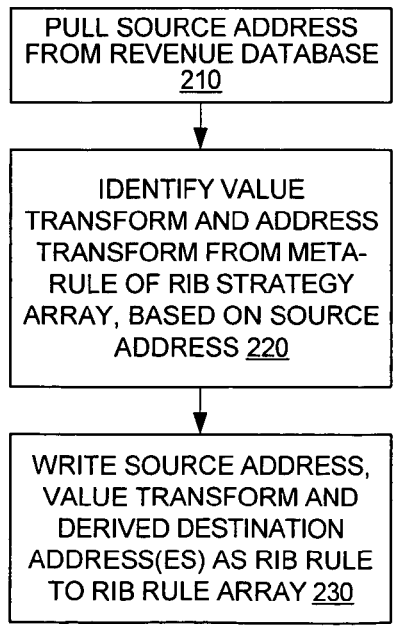
FIG. 2 is a flow diagram representing a method according to an embodiment of the present invention.

FIG. 2 illustrates a method 200 according to an embodiment of the present invention. According to the method, the meta-rule manager may survey various nodes of the revenue database, pulling source addresses for each (box 210). The meta-rule manager may apply the source address to meta-rules of the RIB strategy array and obtain therefrom a value transform and an address transform through which the meta-rule manager may derive one or more destination addresses in the budget database to which the RIB rule is directed (box 220). The meta-rule manager may thereafter write a RIB rule to the RIB rule array specifying the source address(es), the destination address(es) and a value transform which the RIB rule will apply during normal system operation.

FIG. 3 illustrates a simplified data structure that may find application with the foregoing embodiments. In this data structure, an organization is shown having three departments A, B and C. Budget or revenues for department A include elements A1 and A2. Element A1 further includes sub-elements A1.1, A1.2 and A1.3. Budget or revenues for department C are comprised of elements C1, C2, C3, C4 and C5.

When applied to the system of FIG. 1, a revenue database 130 may include a plurality of nodes, one for each revenue item recorded for the organization. Thus, there may be a node for each department A-C, for each element A1-A2 and C1-C5 and for each sub-element A1.1-A1.3. Each node within the revenue database may store various types of information for the organization, including for example, text or numeric codes that identify the organizational unit to which the node applies.

FIG. 3 illustrates bounding boxes to indicate exemplary value transforms to be applied to the various nodes of a revenue database. In this example, a value transform "K" is to be applied to node A1 and all nodes subordinate thereto. A value transform "N" is to be applied to node C and subordinate nodes C1-C4. Another value transform "J" is to be applied to node C5.

The budget database 150 also may possess a nodal structure for storage of budget items including RIB increases to the expenditure budget that are generated from the operation chain 110. The revenue database and the budget database typically will have different data structures, although this need not always be the case; such variations are determined largely by the requirements of the organization for which the budgetary control system 100 is to be used. For the purposes of the present discussion, it is sufficient to note that the revenue database 130 and budget database 150 each store their respective values in nodes, which can be individually addressed.

FIG. 4 illustrates a RIB strategy array 400 that may be employed for the various value transforms illustrated in FIG. 3. Three meta-rules of the RIB strategy array (410-430) are illustrated. Meta-rules store information representing strategies for creating new RIB rules in the enterprise management application. Each meta-rule may include a source identifier field 440, which may explicitly identify one or more revenue database nodes (explicit "source addresses") to which the meta-rule applies. Each meta-rule also may include a value transform definition field 450 specifying parameters for the calculation of the RIB increases, including a definition of the relevant type of revenues, and an address transform field 460. Each address transform may contain an address transform function that, when applied to an identified source address, derives one or more destination addresses in the budget database. If several destination addresses are assigned, then weighting coefficients may be defined in order to distribute the amount of RIB increases among them. As a further option, the address transform field may also specify whether each source address identified by the present meta-rule will trigger the creation of separate RIB rules or whether all identified source address belong to a single RIB rule thus sharing their revenues before applying the assigned value transform.

In the example of FIG. 4, three meta-rules 410-430 are defined for the RIB strategy array 400 using explicit nodes or source addresses of the revenue database as entries in the source identifier field 440. When the rule manager operates on the revenue database, however, it would write up to ten new RIB rules to the RIB rule array 140 (FIG. 1). As noted, modern organizations include databases with many thousands or many tens of thousands of nodes used for storing revenue items, but only a handful (say, 3-4) unique value transforms and only a limited number of different address transforms are used. Thus, the configuration chain of FIG. 1 eliminates much of the manual configuration that traditionally has been required to implement RIB rule systems.

As noted, the meta-rule manager may derive one or more destination addresses into the budget database 150 from a source address as determined by the address transform field 460. Revenue items may be assigned to nodes of the revenue database 130 according to several dimensions. The address transform may be as simple as replacing one or more of the dimension values of the source address with other pre-selected values and, if required, adding weighting coefficients in the case where several destination addresses are to be derived. In one example, revenue items may be categorized by the dimensions "fund," "department" and "commitment item." The address transform may dictate that, no matter what the source address is, the budgetary addresses change the commitment item value to 430000. Thus, the meta-rule manager may perform the following address derivations before writing RIB rules:

| SOURCE ADDRESS | | | DESTINATION ADDRESS | | |
| --- | --- | --- | --- | --- | --- |
| FUNDING | DEPARTMENT | COMMITMENT ITEM | FUNDING | DEPARTMENT | COMMITMENT ITEM |
| General_Funding | DEP1 | 800000 | General_Funding | DEP1 | 430000 |
| Special_Purpose | Central_Dep | 840000 | Special_Purpose | Central_Dep | 430000 |

The types of address transforms to be performed, of course, depend on the structure of the respective databases 130, 150 and the budgetary requirements of the organization for which the budgetary control system is to be deployed. They may vary considerably, but in general only a limited number of address transforms is needed to fully describe the relation between source and destination addresses in RIB rules.

FIG. 5 illustrates RIB rules that may be written to the RIB rule array 140 (FIG. 1), using the example of FIG. 4. The RIB rules 510, 520, etc., each may include a source address field 540 identifying a single entry from the revenue database 130 to which the RIB rule applies, a value transform field 550 defining the relevant type of revenues and other necessary parameters to determine the amount of RIB increases and a destination address field 560, identifying one or more locations in the budget database 150 where RIB increases are to be stored. If several destination addresses are specified, then in general weighting coefficients are needed, too, for distributing the RIB increases.

The foregoing example illustrates the source identifier fields 440 of the RIB strategy array to include explicit source addresses of the revenue database 130. Alternate embodiments permit the meta-rules to be defined using triggering conditions on source addresses or on alternate sources of information, which typically are stored in the database nodes in association with the revenue items. Thus, rather than using explicit address information that directly indicates the nodes' locations within the database system, the meta-rule manager 160 may generate RIB rules from meta-rules using conditions for source addresses or for additional information stored in the nodes of the revenue database 130. As representative examples, revenue items might include:

- department codes, identifying an organizational department to which the revenue item belongs,
- department names, text strings identifying the department to which the revenue item belongs,
- names of responsible persons, identifying managers with particular needs for the transfer of revenues
- purpose or functional aspects of the revenues, codes or text strings identifying additional details of the revenue items In such embodiments, during a configuration period, the meta-rule manager 160 may traverse the revenue database 130, retrieving relevant identifiers from the nodes as it goes along. By comparing the retrieved identifiers against triggering conditions stored in the meta-rules of the RIB strategy array 170, the meta-rule manager may determine which value transform and which address transform, if any, apply to the revenue item. It may then write an appropriate new rule RIB to the RIB rule array 140.

FIG. 6 illustrates meta-rules of a RIB strategy array 170 according to another embodiment of the present invention. There the source address field 640 of the meta-rules 610, 620, and 630 may include a triggering condition, rather than explicit source addresses, that must be met before generating a new RIB rule for a node from the revenue database. Exemplary triggering conditions are illustrated in the figure. Again, a comparison is made between the name of the source address or the contents of the revenue item stored in the revenue database 130 and the triggering condition to determine whether a new RIB rule is to be generated. And, of course, triggering conditions may be predicated on boolean operations of multiple conditions (e.g., Dept Code="1234" OR "5678", Proj Code="0987" AND Dept Code="4321", etc.). The meta-rules 610, 620, and 630 also may include a value transform field 650 and an address transform field 660 as described above.

In a further embodiment, the RIB rule array 140 (FIG. 1) may be omitted altogether. When a new revenue item is posted within the system, the meta-rule manager 160 may identify which meta-rule (if any) applies to the revenue item by referring to the RIB strategy array 170. If a meta-rule is identified, the meta-rule manager 160 may retrieve the appropriate value and address transforms. The system may generate a RIB budget item from the revenue item using the value transform and the destination address(es) obtained from the address transform and store it to the budget database 150. In this embodiment, the operation chain 110 of the system need not be populated by a RIB rule array that includes express RIB rules for each entry in the revenue database 130.

Figure 7:
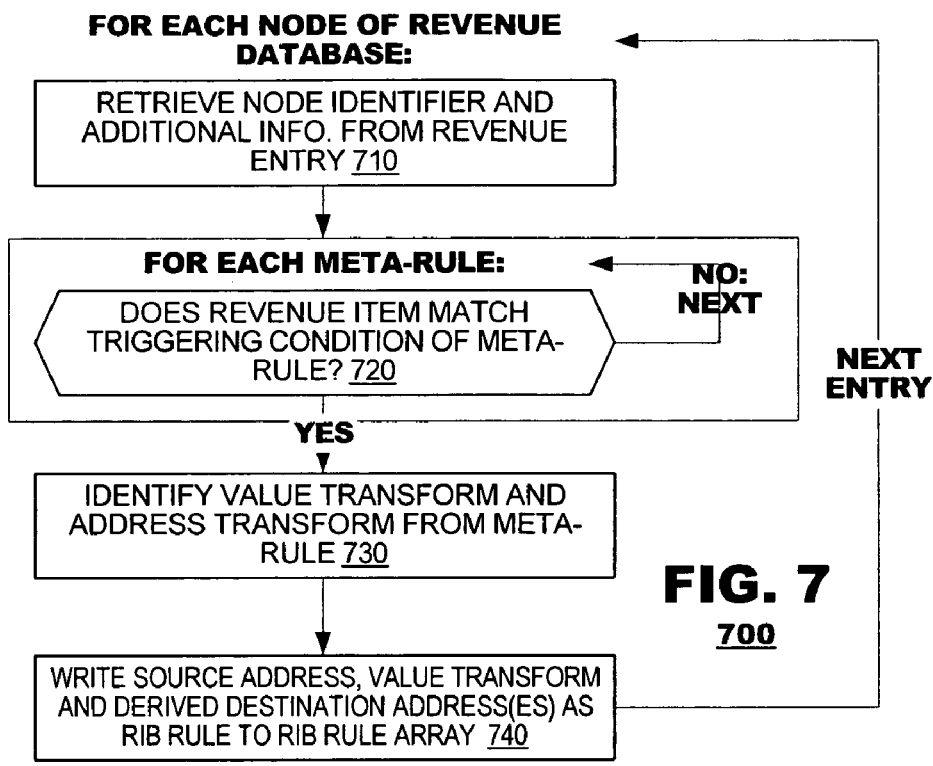
FIG. 7 is a flow diagram representing a method according to another embodiment of the present invention.

FIG. 7 illustrates a method according to another embodiment of the present invention for generating RIB rules according to a RIB strategy array. According to the method, for each node of the revenue database, the system may retrieve an appropriate node identifier (source address) and additional information from the revenue entry (box 710). The system may compare the node identifier and the additional information to the triggering conditions stored in the source identifier field of the meta-rule in the RIB strategy array (box 720). If the retrieved identifier matches a triggering condition of one of the meta-rules, the system may retrieve the value and address transforms of the associated meta-rule (box 730). The system may generate a RIB rule which identifies the source address(es) in the revenue database, the value transform and the destination address(es) in the budget database as derived from the address transform and write the RIB rule to the RIB rule array (box 740). The method may operate for as many nodes of the revenue database as are desired.

Returning to FIG. 1, according to an embodiment including an editing tool 180, this tool may assist an operator to define meta-rules of the RIB strategy array 170 without having to manually enter multiple source addresses and the like. In a first embodiment, the tool 180 may display a tree diagram illustrating inter-relationships among nodes of the revenue database 130 in a manner similar to the illustration of FIG. 3. From the display, an operator may select one or more nodes to include in the source identifier field of a meta-rule. Additionally, the tool 180 may accept commands to signify that all nodes sub-ordinate to an including a selected node are to be included in a meta-rule (e.g., clicking on node C would include nodes C1-C5). The tool 180 also may accept commands indicating that a selected node (e.g., C5) is to be excluded from a previously selected set of nodes. Alternatively, the tool may assist an operator to specify triggering conditions for nodes of the revenue database or for additional information stored with the revenue items. Such conditions may include multiple conditions and Boolean operations of simple conditions.

Figure 8:
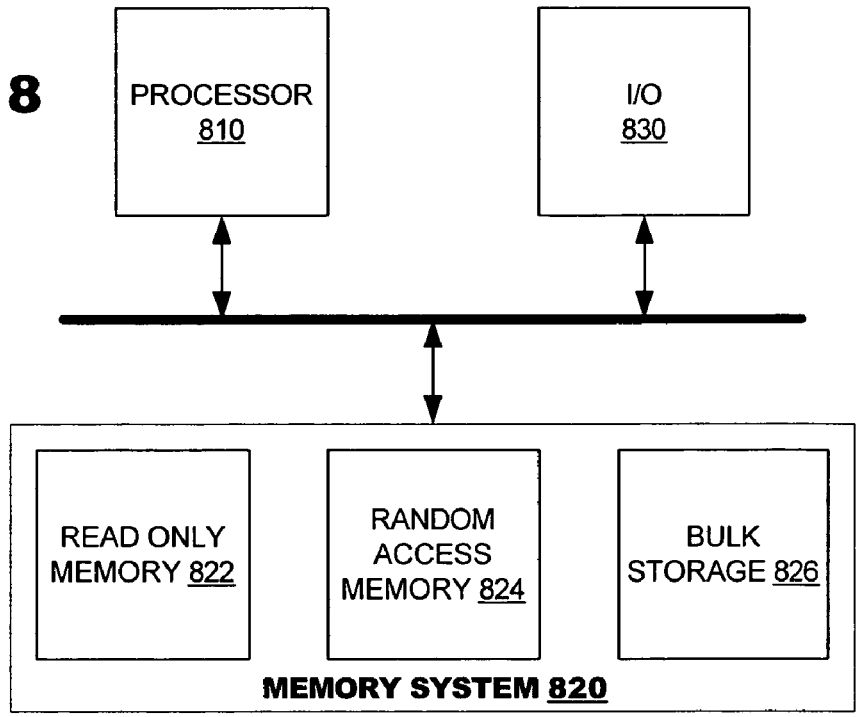
FIG. 8 is a simplified block diagram of a processing system adapted for use with embodiments of the present invention.

The foregoing embodiments may provide a software-implemented system. As such, these embodiments may be represented by program instructions that are to be executed by a server or other common computing platform. One such platform 800 is illustrated in the simplified block diagram of FIG. 8. There, the platform 800 is shown as being populated by a processor 810, a memory system 820 and an input/output (I/O) unit 830. The processor 810 may be any of a plurality of conventional processing systems, including microprocessors, digital signal processors and field programmable logic arrays. In some applications, it may be advantageous to provide multiple processors (not shown) in the platform 800. The processor(s) 810 execute program instructions stored in the memory system. The memory system 820 may include any combination of conventional memory circuits, including electrical, magnetic or optical memory systems. As shown in FIG. 8, the memory system may include read only memories 822, random access memories 824 and bulk storage 827. The memory system not only stores the program instructions representing the various methods described herein but also can store the data items on which these methods operate. The I/O unit 830 would permit communication with external devices (not shown).

As shown above, the foregoing embodiments provide a useful tool for automatically generating and writing RIB rules when configuring an enterprise management application for use with large data structures of revenue and budget databases and somewhat redundant RIB policies.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of installing a computer application supporting revenues increasing a budget (RIB) functionality, comprising, during an installation phase of the computer application:
   comparing source addresses of a revenue database to address sets specified in meta-rules of a RIB strategy array,
   building a RIB rule for each source address that matches a meta-rule, wherein the RIB rule identifies:
      the respective revenue database source address that created the match,
      a value transform retrieved from the matching meta-rule array, and
      at least one destination address in a budget database to which results of the RIB rule are to be stored; and
   storing the built RIB rule in a RIB rule array data-structure for use in transaction processing of an electronic accounting computer system.

2. The method of claim 1, wherein a value transform of a meta-rule indicates a threshold that posted revenue must meet before a RIB item will be generated.

3. The method of claim 1, wherein a value transform of a meta-rule indicates a type of revenue that is relevant to the RIB rule.

4. The method of claim 1, further comprising storing the RIB rule in a RIB rule array of an operation chain in an enterprise management application.

5. The method of claim 4, wherein the number of meta-rules in the RIB strategy array is smaller than the number of RIB rules generated therefrom.

6. The method of claim 1, further comprising, via an editing tool, specifying explicit source addresses of the source identifier field for each meta-rule with reference to a graphical representation of a structure of the revenue database.

7. The method of claim 1, further comprising generating a RIB budget item from a posted revenue item according to a RIB rule of the RIB rule array and storing the RIB budget item in the budget database.

8. The method of claim 7, wherein the RIB budget item, as stored in the budget database, does not contain a reference to a RIB rule of the RIB rule array.

9. The method of claim 1, wherein at least one meta-rule generates a plurality of RIB rules.

10. The method of claim 1, wherein the method is repeated to update the RIB rule array.

11. The method of claim 1, wherein the at least one destination address is specified as a function of the respective revenue database source address.

12. The method of claim 11, wherein the function returns multiple destination addresses.

13. The method of claim 12, wherein the function allots relative amounts to the multiple destination addresses, the sum of the relative amounts being equal to a result of the value transform.

14. A computer readable medium storing program instructions related to revenues increasing a budget (RIB) that, when executed, cause a device to perform a method of initializing a computer application supporting revenues increasing a budget (RIB) functionality, comprising, during an initialization phase of the computer application:
   comparing addresses of a revenue database to source addresses explicitly specified in meta-rules of a RIB rule strategy array,
   generating a RIB rule for each address that matches an entry of the RIB rule strategy array, wherein the RIB rule identifies:
      the respective revenue database source address that created the match,
      destination addresses in a budget database to which results of the RIB rule are to be stored, and
      a value transform specified in the entry of the rule strategy array; and
   store the generated RIB rule in a RIB rule array for use in transaction processing of an accounting system.

15. The medium of claim 14, wherein the instructions further cause the device to store the RIB rule in a RIB rule array of an operation chain in an enterprise management application.

16. The medium of claim 14, wherein the instructions further cause the device to calculate a RIB budget item from a posted revenue item according to the generated RIB rule and to store the RIB budget item in a budget database.

17. The medium of claim 16, wherein the RIB budget item, when stored in the budget database does not reference a RIB rule in the RIB rule array.

18. The medium of claim 14, further comprising a RIB strategy array storing a plurality of meta-rules, each meta-rule comprising a source identifier field explicitly identifying a plurality of nodes of the revenue database.

19. The medium of claim 14, further comprising a RIB strategy array storing a plurality of meta-rules, each meta-rule comprising a field identifying a value transform and another field identifying an address transform for deriving destination addresses in the budget database.

20. A method related to revenues increasing a budget (RIB), comprising:
   maintaining one or more RIB meta-rules, where each meta-rule includes a source identifier, a value transform, and a destination identifier;
   receiving one or more revenue items, where each revenue item is stored in a revenue database and includes a source address and a value;
   comparing on the computer system a respective source address of at least one revenue item and a source identifier of at least one meta-rule,
   building a RIB rule for each source address that is included in the source identifier, wherein the RIB rule includes:
      a value transform for transforming the value;
      a destination address function for calculating a destination address in a budget database based on the source address and the destination address function; and
   storing the RIB rule in a RIB rule array for use in transaction processing of an accounting system.

21. The method of claim 20, where the source identifier identifies a plurality of source addresses.

22. The method of claim 20, where the destination identifier includes at least one location in the budget database that the at least one revenue item will affect.

23. The method of claim 20, where the generated RIB rule also includes a source address.

24. The method of claim 20, where the comparing is performed with the at least one revenue item and each meta-rule.

25. The method of claim 20, where the comparing is performed with each revenue item and the at least one meta-rule.

26. The method of claim 20, where the comparing is performed for each revenue item with each meta-rule.

* * * * *